United States Patent [19]

Mark

[11] Patent Number: 4,922,433

[45] Date of Patent: May 1, 1990

[54] AUTOMATIC IRRIGATION WATER CONSERVATION CONTROLLER

[76] Inventor: Arnold Mark, 2485 Malibu Rd., Bellmore, N.Y. 11710

[21] Appl. No.: 137,457

[22] Filed: Dec. 23, 1987

[51] Int. Cl.⁵ .................... G06F 15/46; A01G 25/16
[52] U.S. Cl. .................................. 364/510; 364/420; 364/141; 364/153; 340/602; 73/73; 137/624.2; 239/63; 239/71
[58] Field of Search ............... 364/420, 509, 510, 138, 364/141, 152, 153; 340/604, 602; 73/73, 74, 77; 137/624.18, 624.2; 239/63, 71

[56] References Cited

U.S. PATENT DOCUMENTS

| | | | |
|---|---|---|---|
| 4,165,532 | 8/1979 | Kendall et al. | 364/510 |
| 4,176,395 | 11/1979 | Evelyn-Veere et al. | 364/510 |
| 4,189,776 | 2/1979 | Kendall | 364/510 |
| 4,423,484 | 12/1983 | Hamilton | 364/420 |
| 4,567,563 | 1/1986 | Hirsch | 364/420 |
| 4,569,020 | 2/1986 | Snoddy et al. | 364/510 |
| 4,626,984 | 12/1986 | Unruh et al. | 364/420 |
| 4,646,224 | 2/1987 | Ransburg et al. | 364/420 |
| 4,799,142 | 1/1989 | Waltzer et al. | 364/420 |

*Primary Examiner*—Parshotam S. Lall
*Assistant Examiner*—Brian M. Mattson
*Attorney, Agent, or Firm*—Collard, Roe & Galgano

[57] ABSTRACT

A water conservation system that connects between a standard irrigation system that is controlled by a clock, and the water control valves of that system in order to limit the flow of water during timed irrigation cycles. When the timed watering cycles are initiated by the standard irrigation system, the water conservation device senses the moisture in the soil and compares it with preset wet and dry moisture limits and scales back each of the watering cycles in proportion to the moisture content of the ground to thereby conserve irrigation water that is applied to a ground area. The device includes a moisture sensor, a central processing unit, and a solid state memory that is connected to the central processing unit and the moisture sensor. When the device of the invention is initialized, the solid state memory samples and records the wet and dry moisture readings of the ground zone and stores the resultant wet and dry readings in the memory so that each time the timed irrigation system cycles, the water conservation device senses the moisture compares it with the wet and dry readings and scales back the amount of water applied to the ground area.

15 Claims, 15 Drawing Sheets

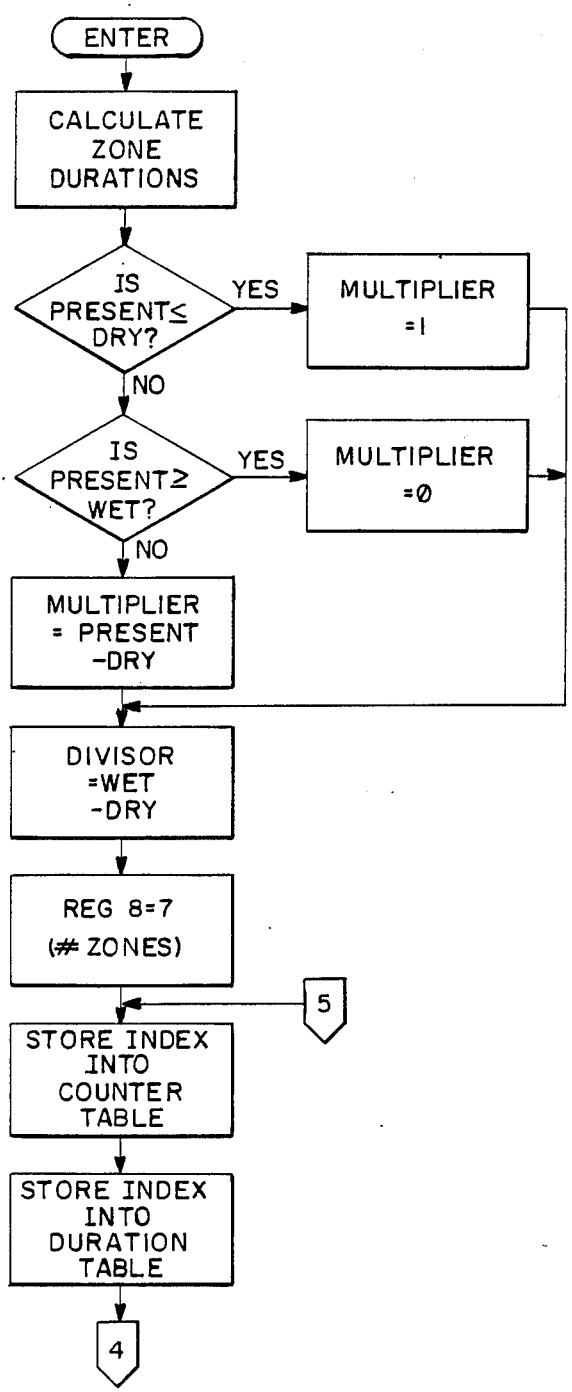
Fig. 4
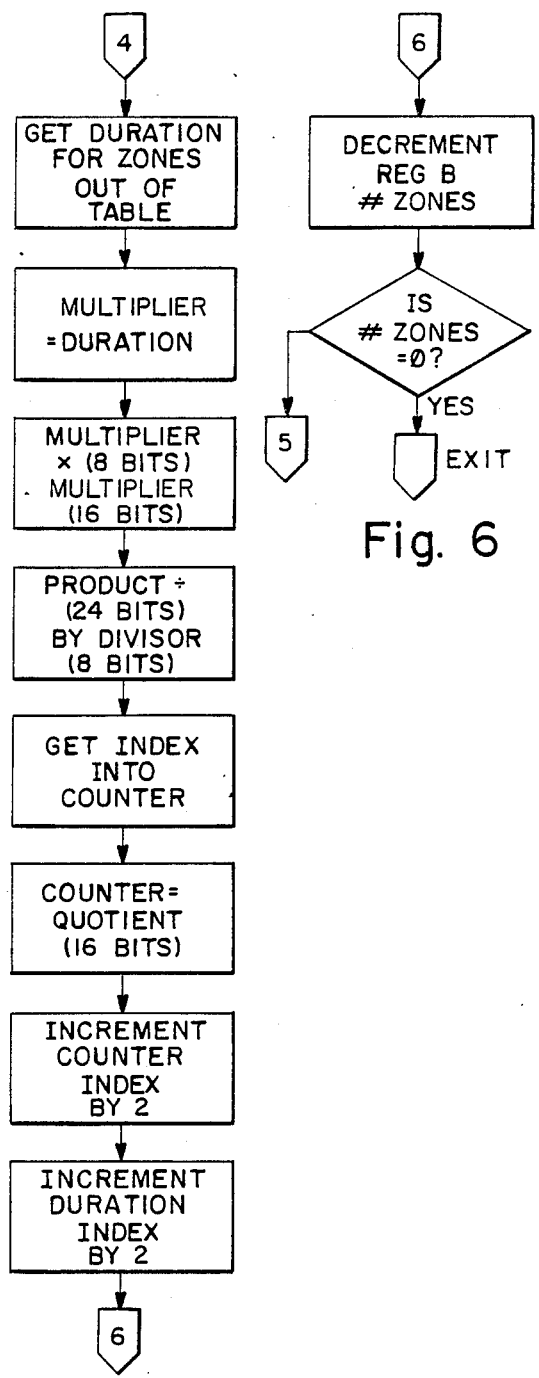
Fig. 5
Fig. 6

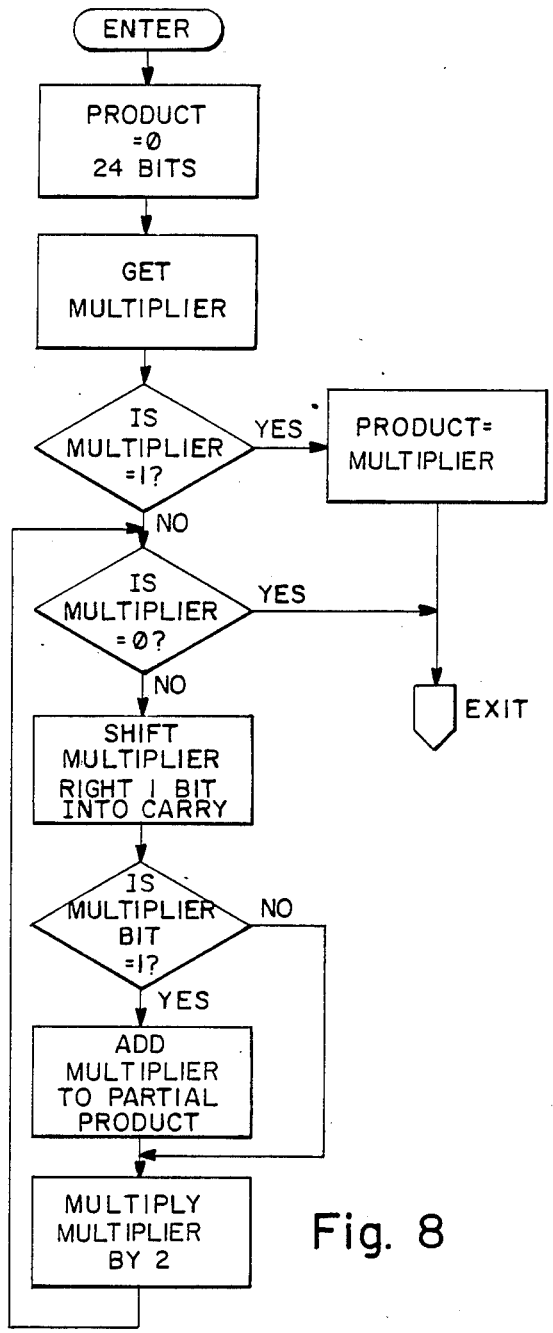
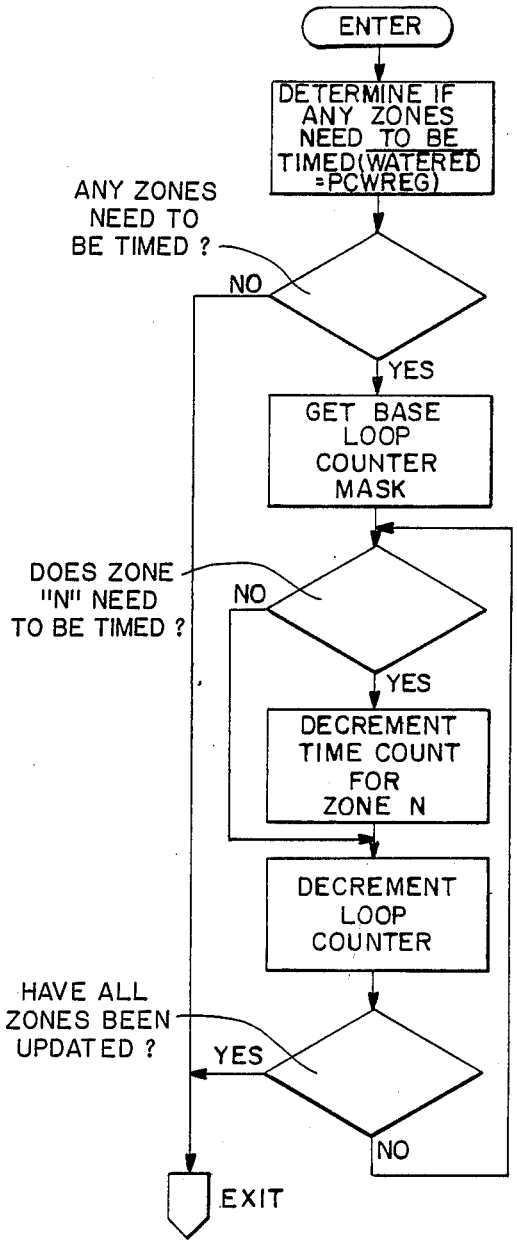
Fig. 8
Fig. 11

AUTOMATIC IRRIGATION WATER CONSERVATION CONTROLLER

The present invention relates to a control system for water irrigation and, more particularly, to an automatic control system for water irrigation which conserves the use of water.

BACKGROUND OF THE INVENTION

Presently, many water irrigation systems provide independent zones which may be programmed manually to activate at specific day and hour settings and for specific durations. These systems, once set, will perform their watering tasks automatically without regard to the soil's moisture level. The controller system of the present invention has been designed to work in conjunction with these existing systems to allow the irrigation system to water only when necessary to optimize water consumption.

The inventive controller system can regulate multiple zones and "learn" the moisture requirements of any irrigation environment. This learning ability is a dynamic feature that allows the inventive controller system to perform equally as well for all types of soils and applications, such as a homeowner's lawn, a golf course, an athletic field, or a farm.

DESCRIPTION OF THE PRIOR ART

There are various prior art systems that attempt to provide water conservation schemes for timed controller irrigation systems. The two most common types of irrigation controllers monitor moisture levels during the irrigation cycle when the sprinkler heads are on, and those that monitor moisture only at the beginning of the irrigation cycle. Each of the two types is connected between the system power source or clock, and the electrically operated water valves or solenoids. The controllers may then break the connection between the clock and solenoid valves to override the power source, so that the system will water less. The primary function of these systems is to allow users to adjust the amount of watering, by turning the systems on and off at predetermined moisture levels that are determined by the user.

Two examples of the type of system which continuously monitors moisture level are the Hydrogene Ion Moisture Sensor (MHIMS-200) available from PEPCO Products (Extruded Products, Inc.) and the Hydroturf System available from Hydrodyne Products, Inc. The MHIMS-200 consists of a single adjustable monitor contained in a plastic case with a passive sensing unit which operates with an electric or hydraulic controller. The monitor has a dial adjustment which may be varied from one to eight cups of water (depending on the desired moisture level) and an indicator light to indicate moisture above the level indicated on the dial. The sensing unit can be located 2,000 feet from the monitor. The Hydroturf System employs a plug-in meter which displays the soil's saturation level which is recorded using a solid state soil moisture sensor that statistically determines the percentage of the soil's pore space. The sensor can be located up to 150 feet from the Hydroturf without any effect on the readings. A 5% increase in the readings occurs at a distance of 1,000 feet or greater. The meter has adjustable upper (Off) and lower (On) settings. The system can be used with or without a time managing clock.

A common problem with the two conventional systems described above is their inability to compensate for water settling time. During the watering cycle, the sensor receives a premature saturation reading due to the fact that the water saturates the soil around the sensor very quickly after the sprinkler system is turned on. Both of these systems fail to take into account the fact that the water will drain down into the soil shortly after the sprinkler system has been shut off. Both of these systems take their moisture readings very shorty after the sprinkler head is shut off. In the Hydroturf System, the reading is taken after only ten seconds. It has been found through experimentation that reading the moisture level immediately after the sprinkler is shut off will give a false reading of saturation. Moisture readings taken ten to twenty minutes after the sprinkler is shut off are more stable and lower in moisture level than those taken immediately after the sprinkler is turned off. Such inaccurate readings by these systems may cause the systems to oscillate between the wet and dry cycles. The premature shut off can also cause an underwatered soil condition which could cause the user to readjust his moisture level setting. Thus, this can create an off setting problem in which the sprinkler system will possibly continue to water when it is raining or very wet outside.

Another common problem of prior art systems is their inability to operate, more than a single zone. A zone normally consists of one to four sprinkler heads which provide watering coverage for a specific area of the user's lawn or garden. All sprinkler heads in a zone are controlled by a single solenoid valve and therefore turn on and off together. These systems cannot be connected to more than one control signal or one zone at a time. To allow operation with more than one zone, the user must purchase additional units for each zone. This can become a costly problem since most home owners with sprinkler systems have seven to twelve zones. This not only increases material costs but has a much higher set up cost because sensors must be located under each zone.

The initial setting of the desired moisture level is also a problem in the conventional systems. For the MHIMS-2000 system, determining the wet moisture setting is very difficult. The instructions state that the owner is to take a handful of soil, wet the soil to the desired moisture level, and then adjust the dial on the master monitor until the green light goes off. This may not be an accurate measurement because the soil which is being measured is not in the ground, surrounded by grass, sand, plants, etc. In the event of a desired change in the moisture level setting, this process must be repeated. The Hydroturf System adjusts the upper (Off) and lower (On) settings manually. This manual setting is also inaccurate due to the lack of settling time.

The second type of systems are those that only monitor the moisture level at the beginning of the irrigation cycle. Two examples of the type of system which only monitors moisture level at the beginning of the irrigation cycle are the Moisture Sensor Inhibitor available from Rainbird, and the Hydrovisor available from Water Conservation Systems, Inc. The Moisture Sensor Inhibitor utilizes a sensor that measures the resistance of the soil. The Hydrovisor measures the water availability by reacting to changes in the soil potentials.

These prior art systems operate as follows: When the irrigation cycle begins, a moisture reading is taken. If the moisture level exceeds a user determined moisture level, the irrigation cycle is inhibited and no watering occurs. When the moisture reading is below the level set by the user, the irrigation cycle occurs uninterrupted. In other words, the cycle either runs for its complete duration or does not run at all. There is no time scaling in either system. In the situation when the reading is 90% of the turn off level, the cycle is operated for the entire duration. This can result in over watering or unnecessary watering of the soil. Both systems have drawbacks in adjusting their moisture level settings. In actual field tests, the procedure was so difficult with the Moisture Sensor Inhibitor that the user eventually placed the system in the bypass mode. For the Hydrovisor system, the levels are preset and no user adjustment can be made. There are three different versions of Hydrovisor systems that can be purchased depending on the soil type (sandy, normal, and clay). This is a problem because soil types are not always easy to define. Moreover, both systems, like the two previous systems, can only control a single zone.

The present invention overcomes the disadvantages of the prior art by providing controllers that are microprocessor based so as to optimize the irrigation process of existing automatic irrigation clocks. The unique feature of the inventive controller system is its ability to adjust to different environments. The system learns the moisture characteristics of any irrigation environment and the duration of the irrigation cycles for each of the seven or twelve zones of the in place irrigation system. The major advantage of this system is that it prerecords moisture readings before the irrigation cycle begins to avoid the sensor saturation problems described previously, and sets the duration of all zones from a single sensor. This learning feature allows these systems to perform equally well in all types of soil applications, such as a homeowner's lawn, a golf course fairway, an athletic field, etc. The inventive system is installed between the user's existing clock and solenoid valves, and therefore can measure each zone's duration just by being placed in the line.

SUMMARY OF THE PRESENT INVENTION

The inventive controller system consists of the base unit and a moisture sensor. The sensor can be installed by running a single pair of wires from the base unit to one of the designated zones and planting of the sensor under the surface of the soil at a predetermined depth. This zone is referred to as the sensor zone. The base unit is connected to the irrigation system by rerouting the driver signal lines for each zone and the master valve controller to the base unit instead of directly to the solenoids.

The microprocessor or central processing unit in the present invention permits the system to support many zones with the use of only a single controller and external moisture sensor. One model of the system supports seven independently controlled zones, while the other supports twelve zones. Each zone can be watered at different times, and for different lengths of time, while being controlled by a single sensor and controller. This open ended design allows more zones to be added with minimal operating system changes. If necessary, two or more systems may be ganged together for a multi-unit operation of many zones. This offers the user a more cost effective solution to his irrigation system and requires very little set up time and effort. A single controller can replace up to twelve prior art systems previously mentioned, and provides a more precise method of water conservation. The seven zone and the twelve zone controllers operate on exactly the same concept.

Another advantage to the system is that moisture levels and durations are not only measured, but stored in memory, to be utilized later in arithmetic computations. A third advantage is that there is a built-in intelligence which allows the coordination and management of numerous events and conditions. These advantages overcome the many drawbacks of the prior art.

The first drawback that was overcome is the soil's water settling time. The inventive controller system waits twenty minutes after the moisture sensor's zone is watered before taking a reading. During this time, the sprinkler head above the moisture sensor may not be turned back on. The inventive controller system will mask this so that the reading taken after the water settles in the soil will not be disrupted. Preferably, four moisture readings are taken and averaged by the unit. This method of measurement provides a higher level of sensor stability, helping to filter out any noise or ambiguous readings.

The system also automatically sets the moist (Off) and dry (On) levels. These levels are determined after the owner depresses the "Learn" pushbutton on the unit's front panel when the ground is dry and in need of water. The inventive controller system immediately takes four soil resistance readings, averages them, and stores the dry readings in memory. The unit is now operating in the "Learning" phase. The unit stays in the "learning" phase until the zone where the sensor is located is watered. At the end of its irrigation cycle, the inventive controller system waits twenty minutes and takes four further soil resistance readings, averages them, and stores the average in memory as a "wet" reading. To measure the "wet" reading, the user stops watering his lawn or garden after it is sufficiently wet, and at this moisture level, he would not want the irrigation system to water further. None that when a valid wet reading (a valid wet reading is one that is approximate five Kiloohms of resistance less than the dry reading) is achieved, the systems are then finished with the "learning" phase. An LED will light on the front planel to indicate that the controllers have received valid "wet" and "dry" readings. If the units do not obtain valid "wet" and "dry" readings, it will stay in the "learning" phase and recycle the next time the automatic irrigation system timer comes on.

During the first full irrigation cycle of the clock, during the "learning" phase, the inventive controller system also times the duration in seconds of each of the zones that are operating in order to gather data for the water conservation cycles. The inventive controller system enters the "learning" phase after the first zone is re-energized by the clock, thereby indicating that an entire irrigation cycle has been completed and that a new irrigation cycle is beginning.

The inventive controller system performs the water conservation algorithm on all irrigation cycles after the "learning" phase is complete. At each re-activation of the sensor zone, the system automatically takes four soil moisture samples, averages them, and stores them in the memory as a present reading. This reading is used to calculate each zone's duration for this irrigation cycle. The system does this by calculating a percentage of time to water (from 0 to 100) of the original duration now stored in memory for each zone. The resultant duration is a fraction of the original duration for which the zone is watered. By sampling before watering and then calculating durations, the problems described previously with the continuously sampling systems are overcome. The system is also inherently stable since if it overwaters or underwaters, the next irrigation cycle will have either a shorter or longer duration, respectively. The system may also be placed in a bypass mode to allow the user to water even when the inventive controller systems have disconnected it from the solenoid valves.

The initializing software runs a complete memory check of all locations and, if successful, flashes an LED on the front panel to alert the user that the unit is functioning properly.

It is therefore an object of the present invention to provide a control system for a water irrigating system that not only senses the dryness of a soil area, but limits the amount of water applied to the soil area based upon the moisture requirements of the soil and the existing dampness of the soil so as to conserve the amount of irrigation water applied to that area.

It is another object according to the present invention to provide a control system for a water irrigating system that is simple in design, efficient and reliable in operation, and inexpensive in cost.

Other objects and features of the present invention will become apparent from the following detailed description considered in connection with the accompanying drawings, which disclose the embodiments of the invention. It is to be understood that the drawings are to be used for the purpose of illustration only, and not as a definition of the limits of the invention.

In the drawings, wherein similar reference characters denote similar elements throughout the several views.

Figure 3A:
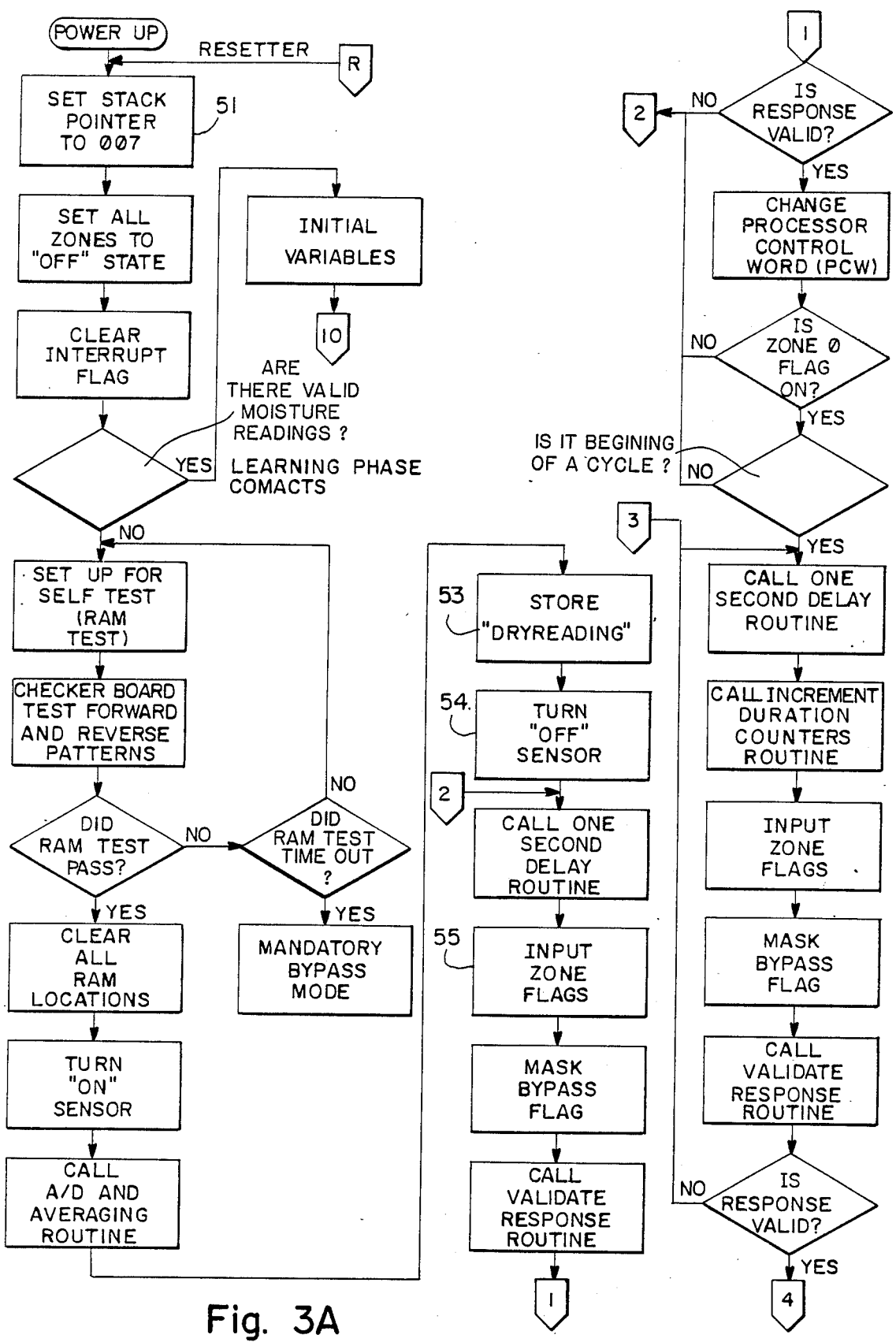
Figure 3B:
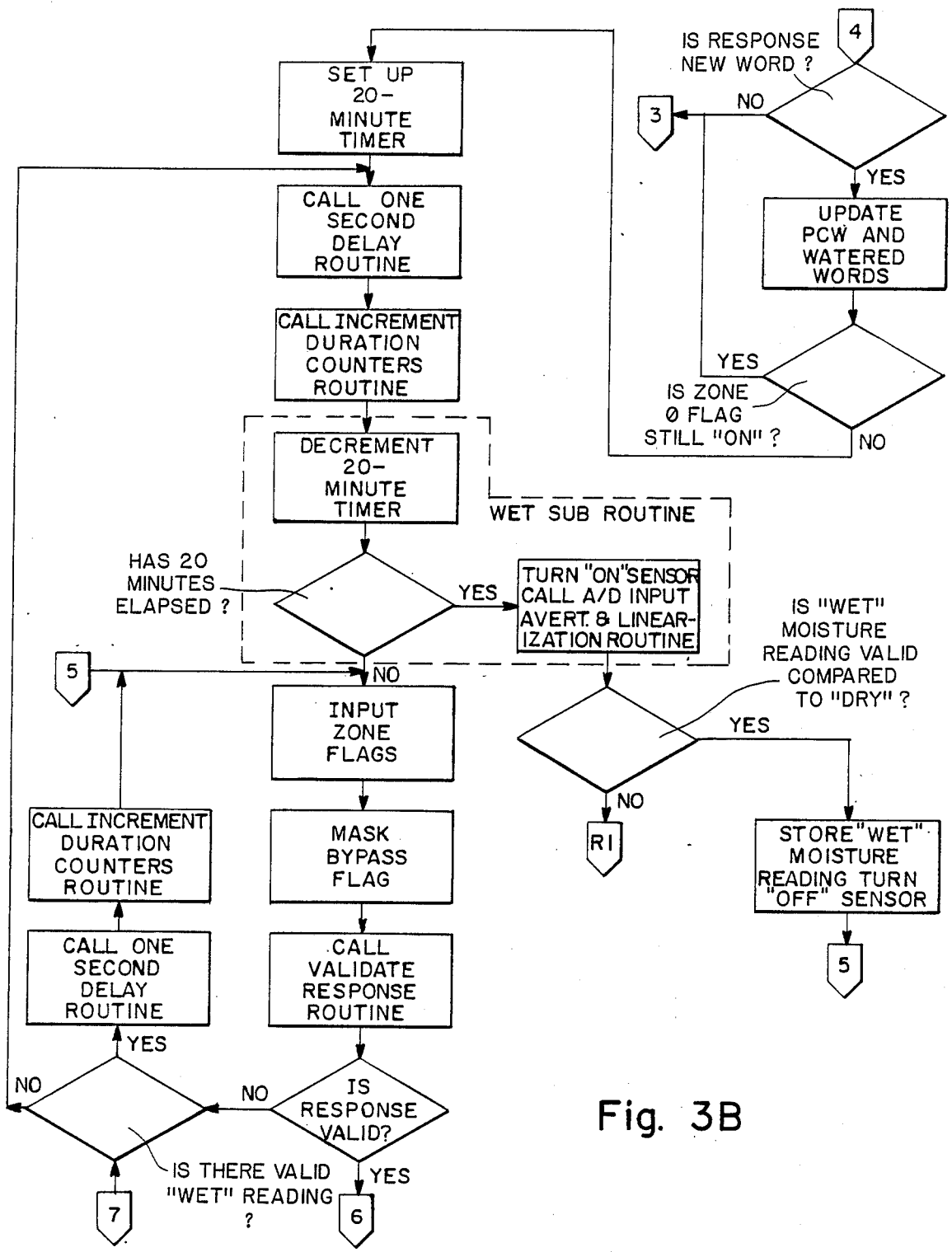
Figure 3C:
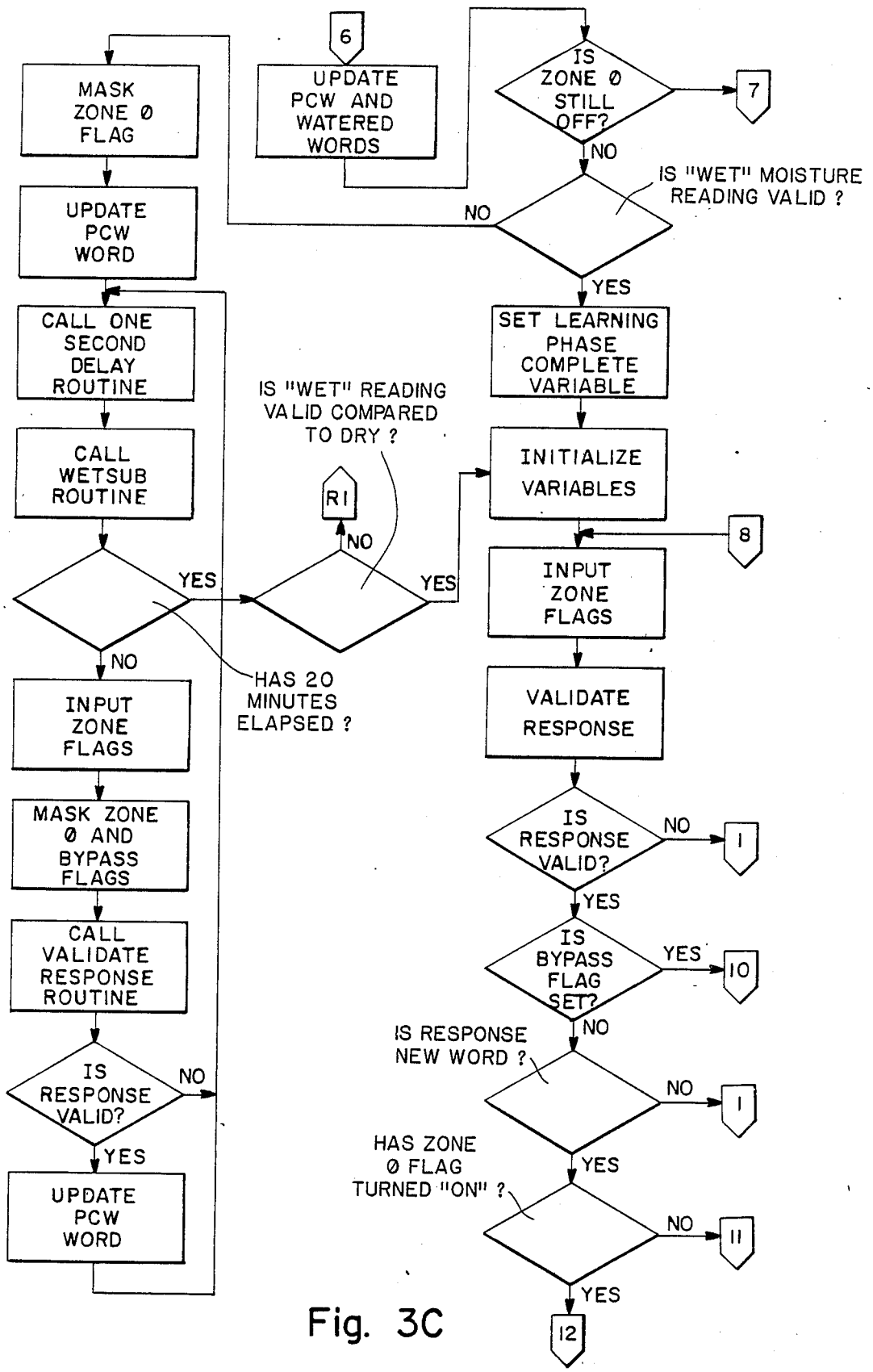
Figure 3D:
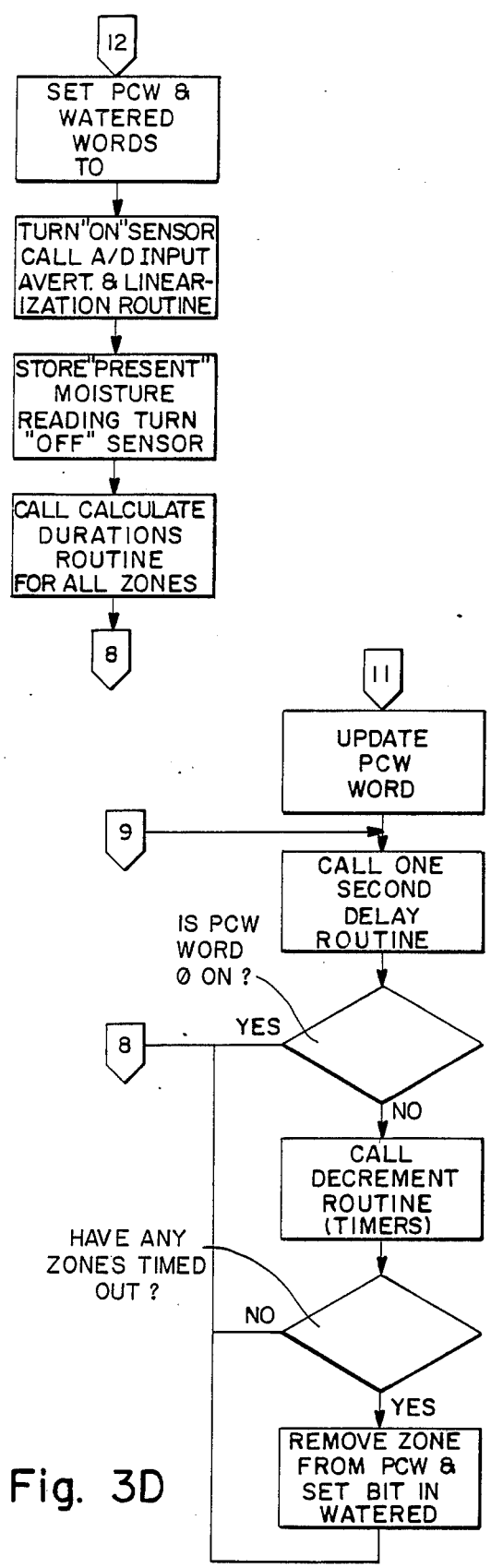
Figure 3D:
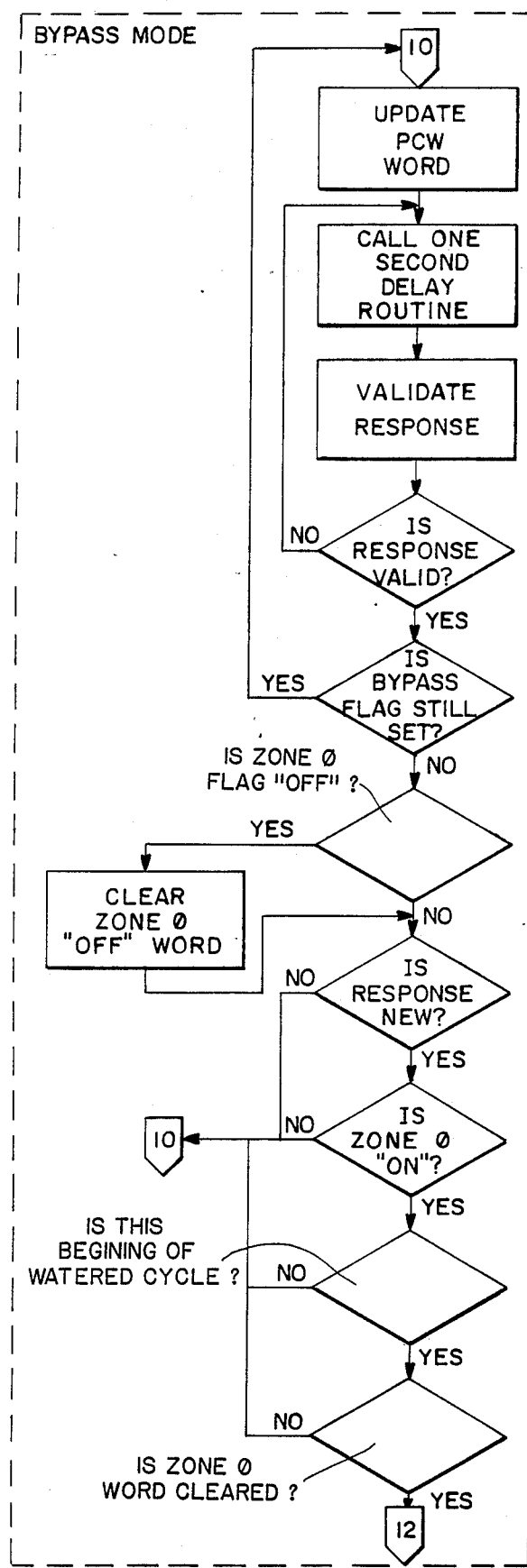
Figure 3E:
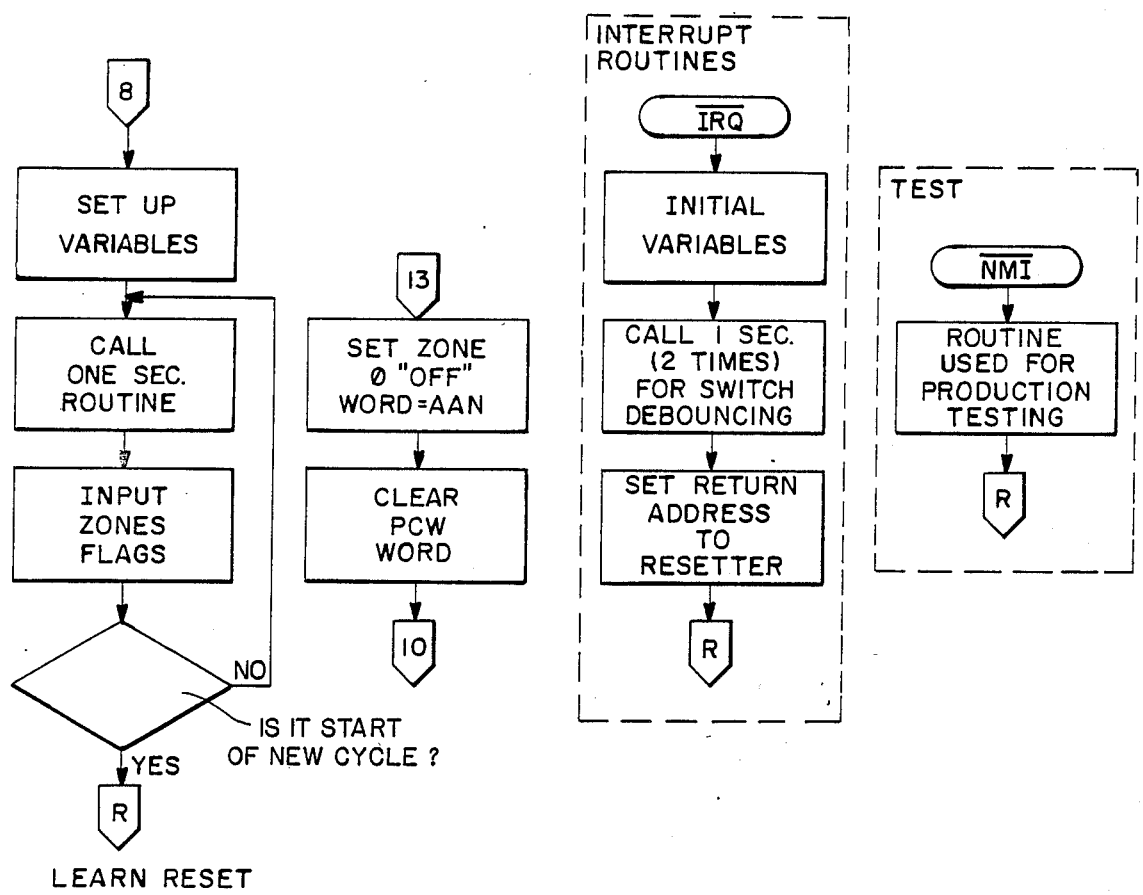
Figure 7:
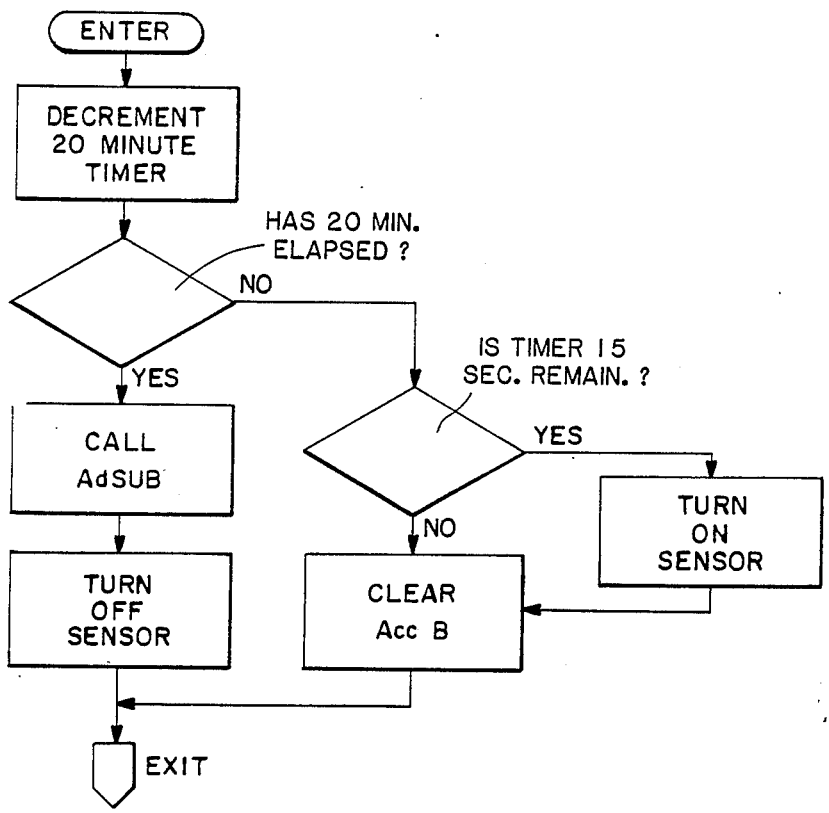
Figure 10:
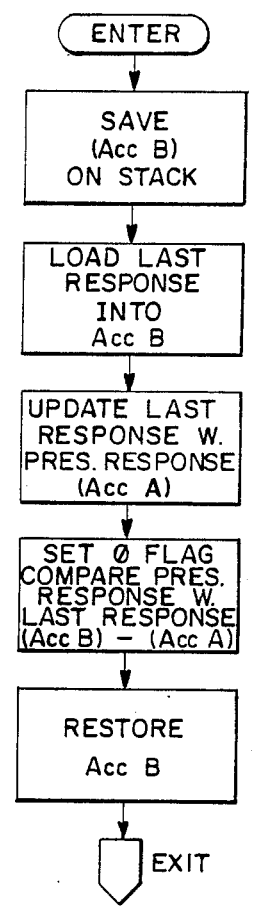
Figure 9:
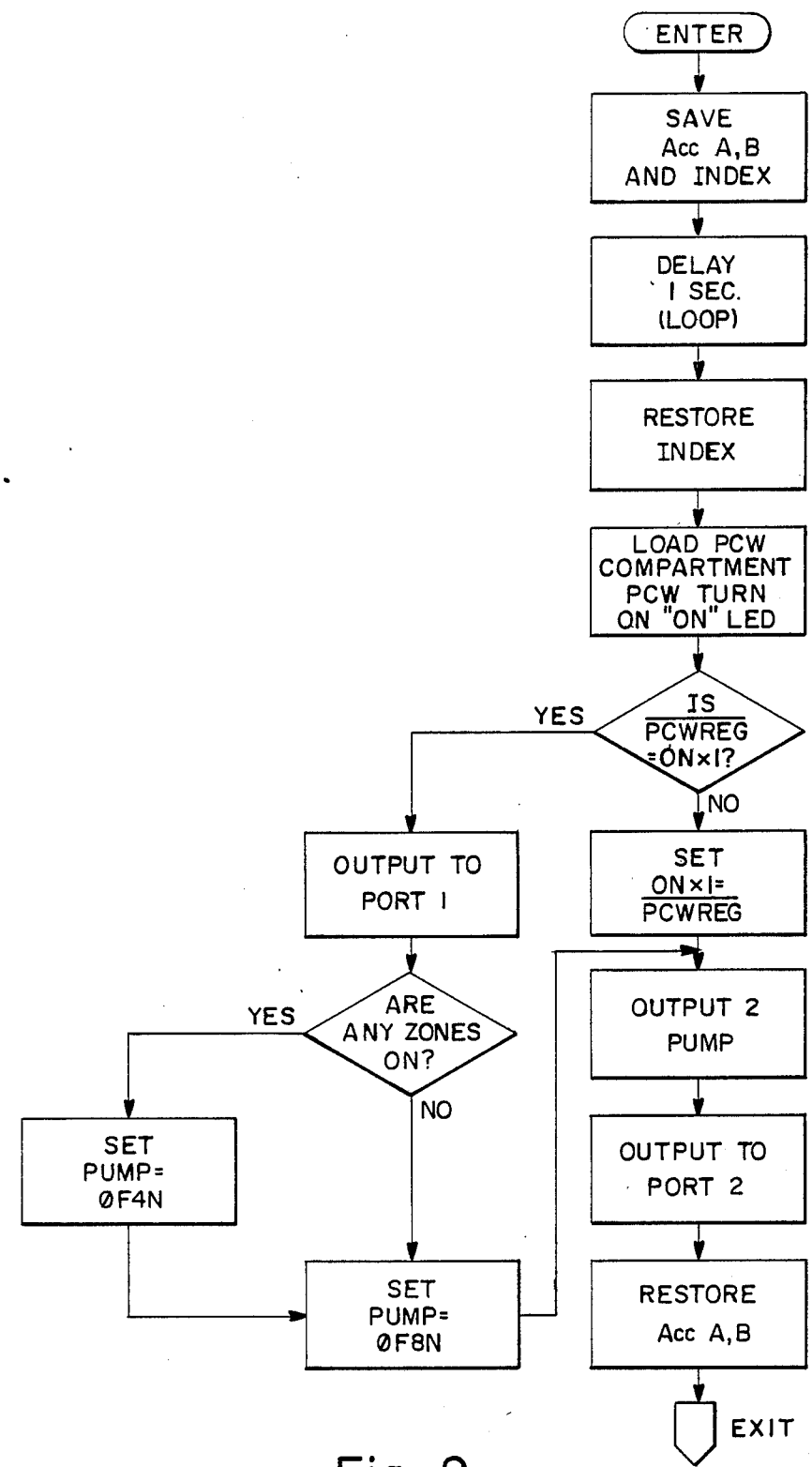
Figure 12:
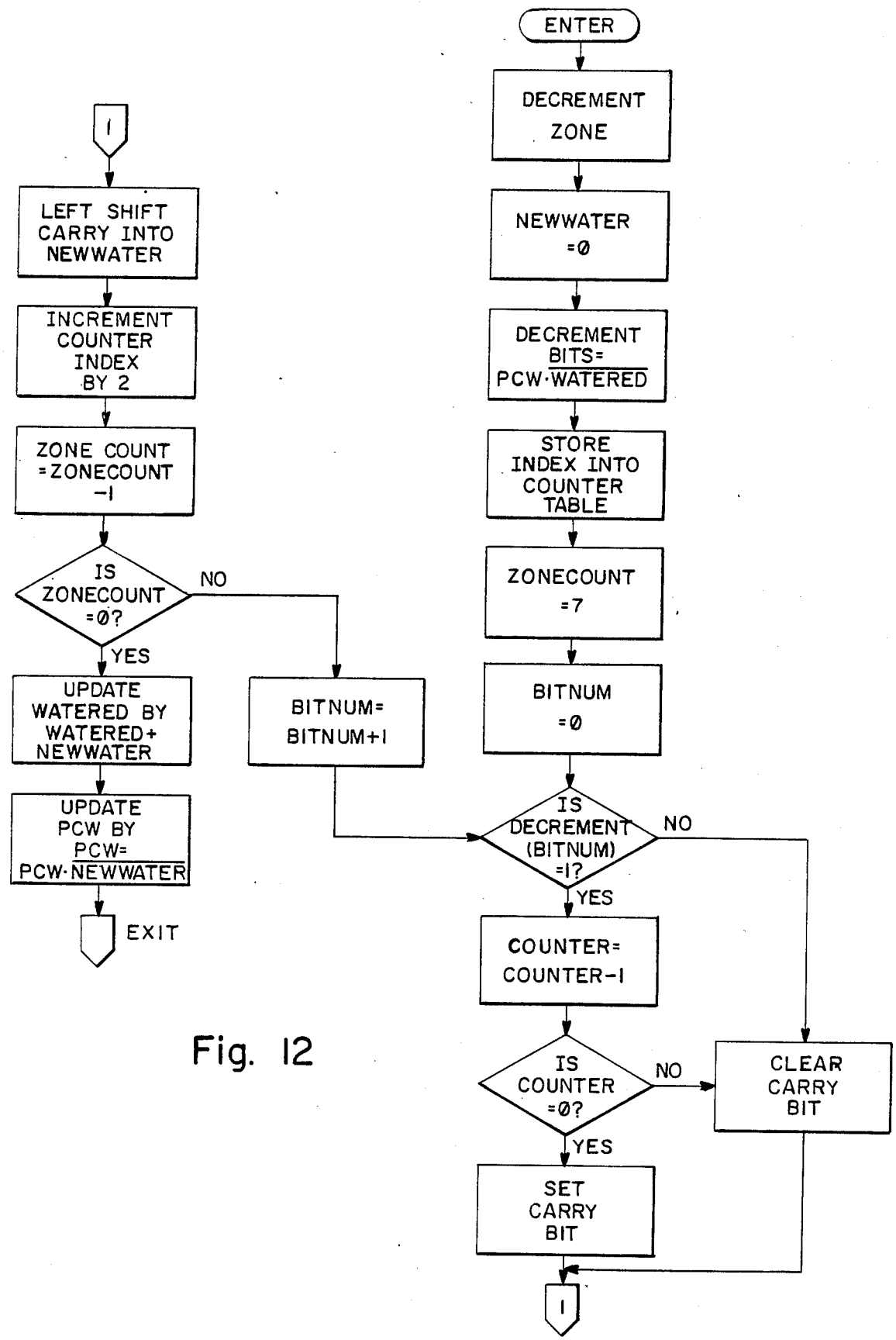
Figure 13:
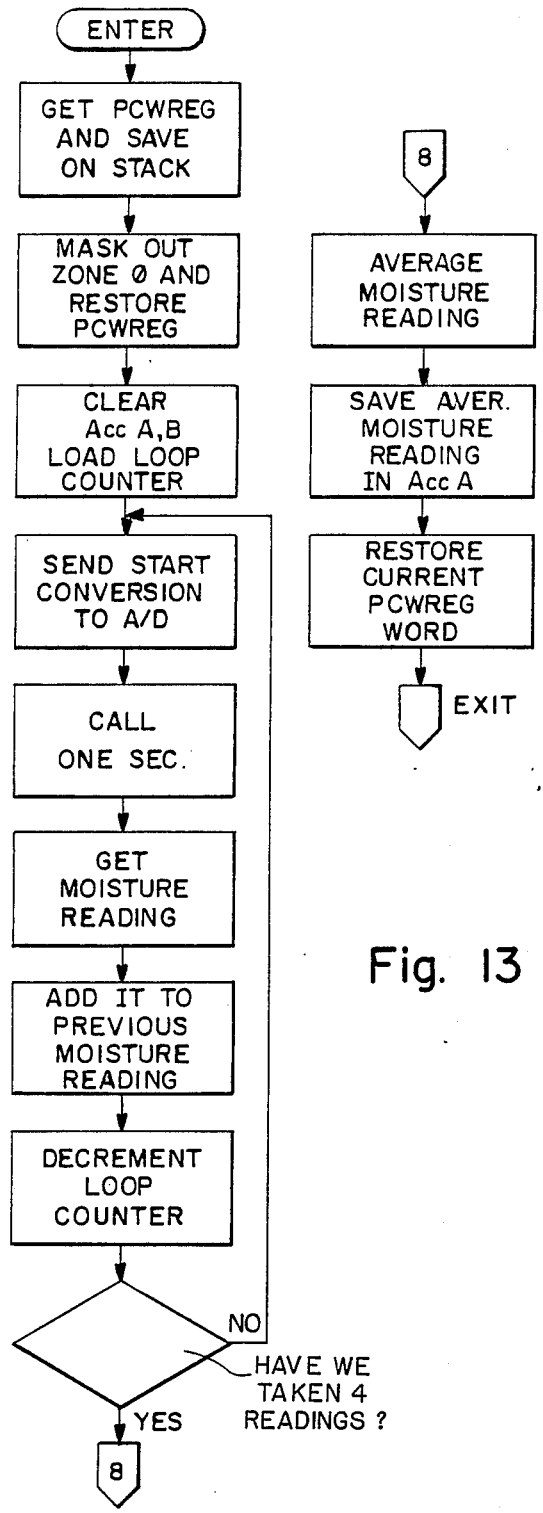
Figure 14:
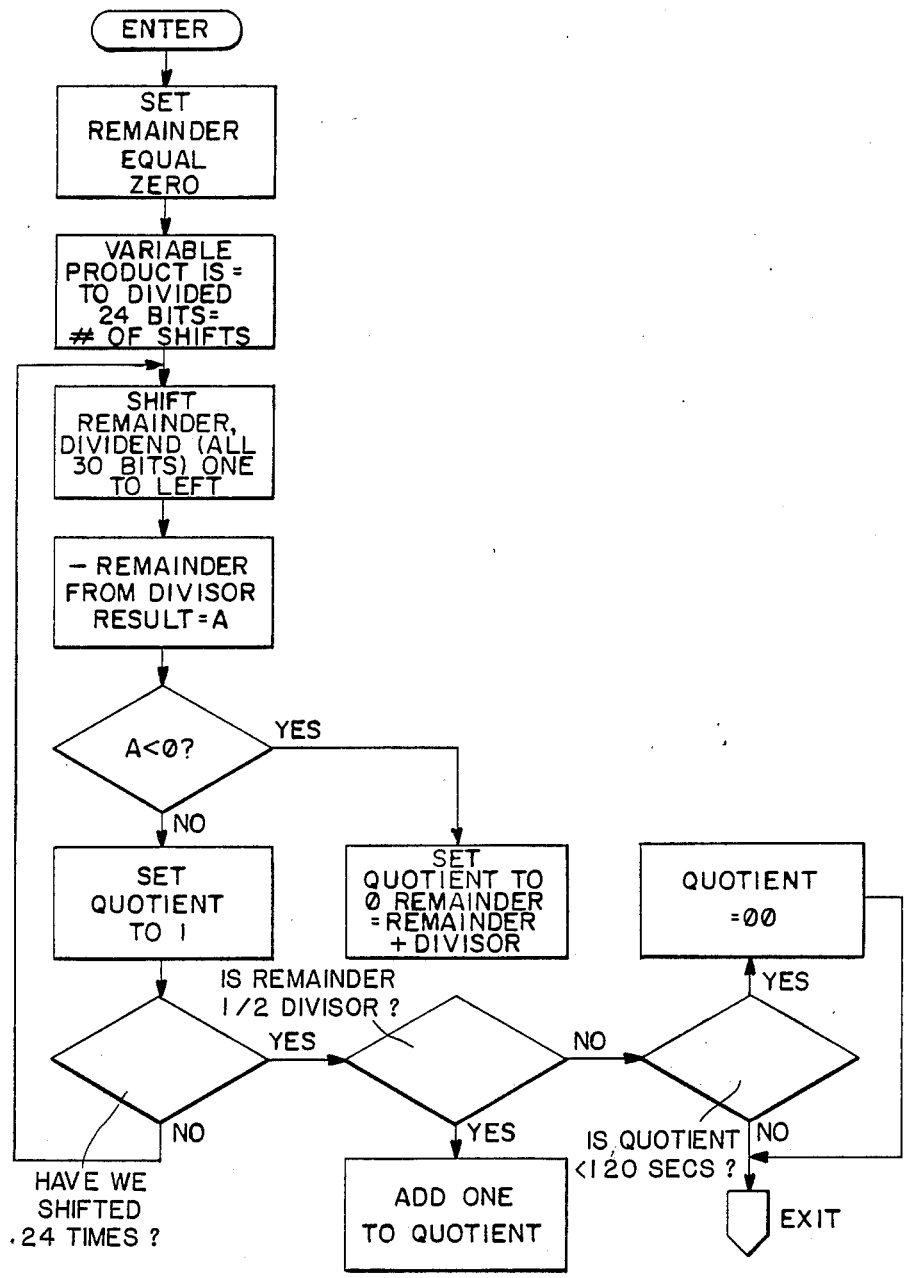

FIGS. 3A, 3B, 3C, 3D and 3E consist of flow charts showing the operation of the inventive program according to the invention;

FIGS. 4, 5 and 6 are subroutine flow charts for calculating zone durations;

FIG. 7 is a subroutine flow chart for wet calculation with a twenty minute timer;

FIG. 8 is a multiplication subroutine chart used in flow charts of FIGS. 3A, 3B and 3C;

FIG. 9 is a one second subroutine flow chart;

FIG. 10 is a validate subroutine;

FIG. 11 is an increment counter subroutine;

FIG. 12 is a decrement subroutine;

FIG. 13 is an add subroutine;

FIG. 14 is a divide subroutine; and

Figure 15:
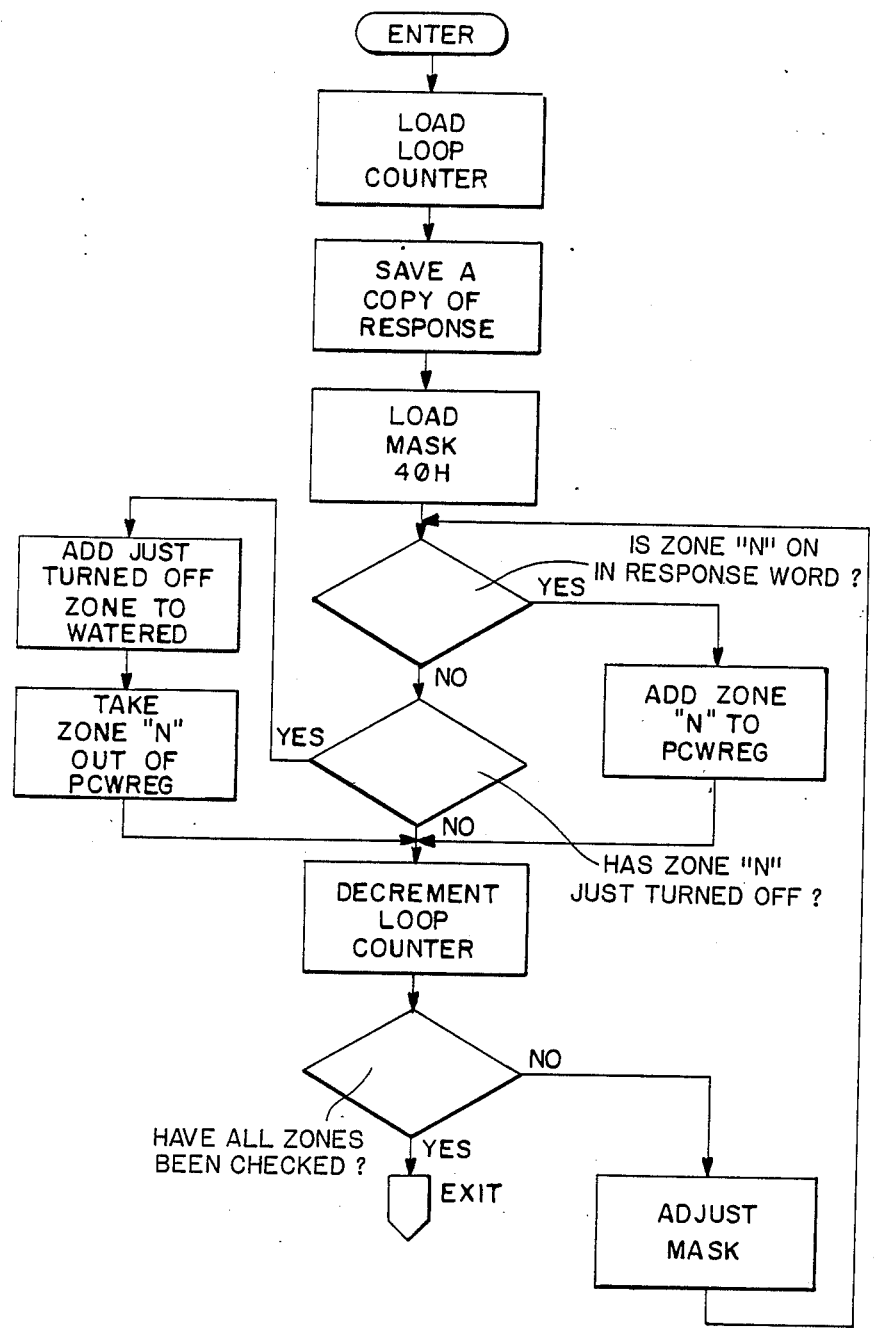

FIG. 15 is a change process control word subroutine.

DETAILED DESCRIPTION OF THE INVENTION

Figure 1:
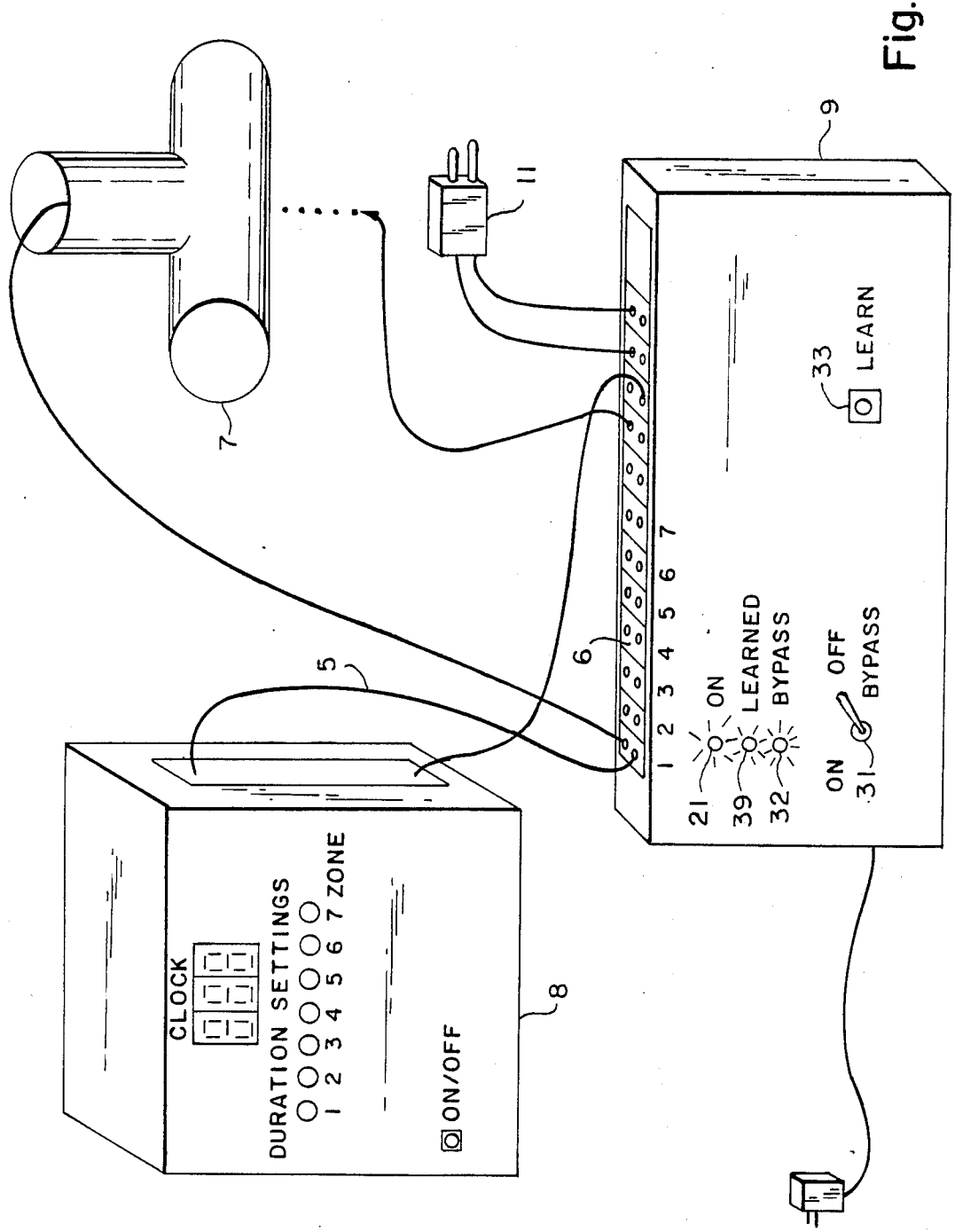
FIG. 1 is a system diagram showing the irrigation system of the present invention coupled to an irrigation controller and a soil sensor.
Figure 2:
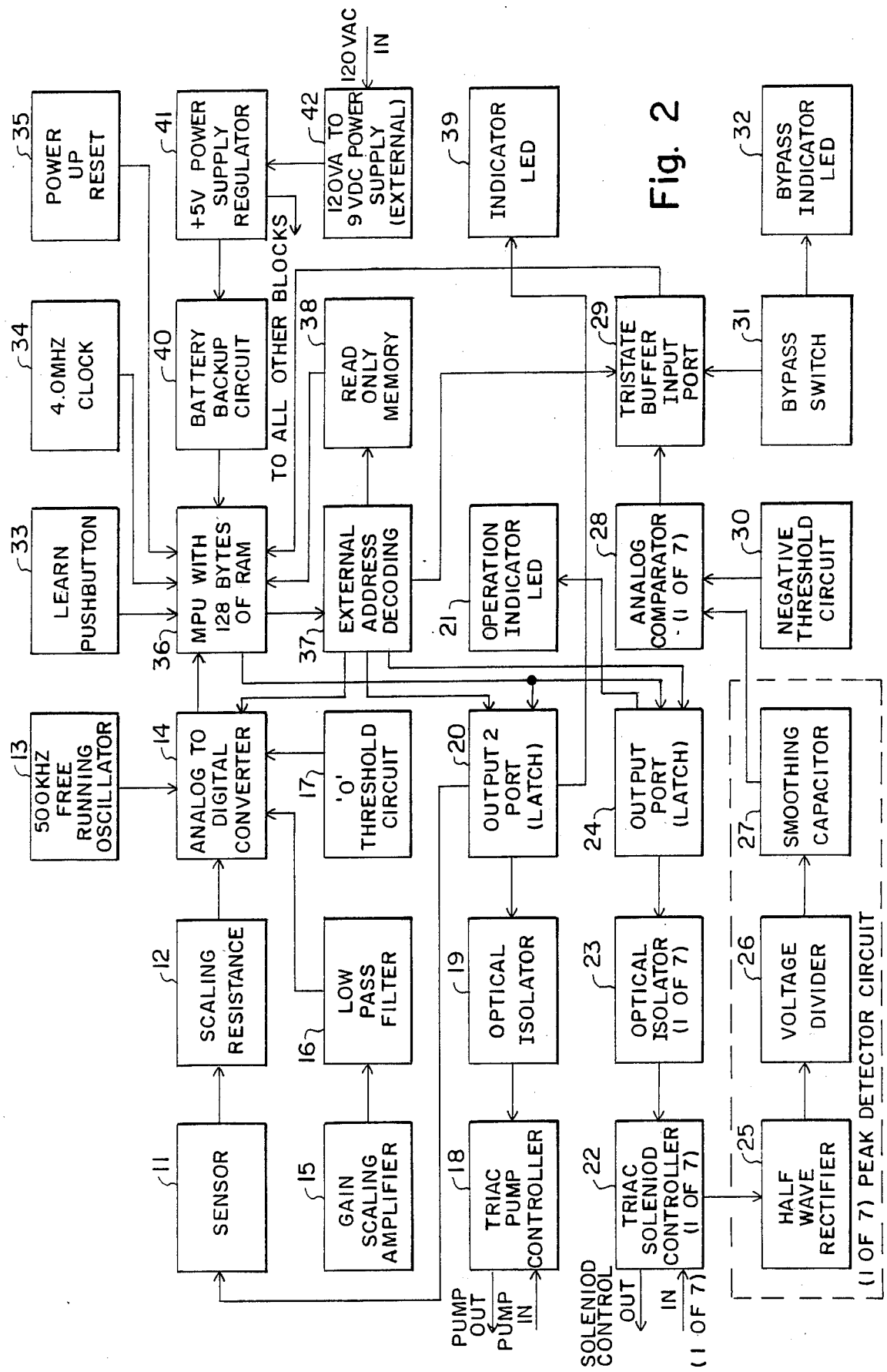
FIG. 2 is a schematic diagram of the inventive control system of the present invention.

Referring to FIGS. 1 and 2, there is shown the conventional irrigation controller 8 having, for example in this instance, seven zones which are capable of operating seven solenoids 7 which are located in different places in the ground to allow water to reach sprinkler heads as is well known in the prior art. The inventive control system 9 is coupled to each output of the irrigation controller 8 so as to be in series with each of solenoids 7. A moisture sensor 11 is also coupled to two terminals of the inventive control system 9 and is generally disposed in the soil adjacent to the first zone which is controlled by the first solenoid.

The base unit 9 has two controls: a bypass switch 31 and a learn button 33. There are also three LED indicators: "on" 21, bypass 32, and learned 39.

When switch 31 is turned on, the system will allow the irrigation system 8 to run without any control from system 9. In this mode of operation, system 9 will be overridden and no water conservation will occur. This feature allows the user to manually override system 9 without making any physical changes to the configuration. This may be important during special watering situations such as a freshly fertilized or seeded lawn.

Moisture sensor 11 is constructed of a series of metal conductive spikes that are placed in the soil, where moisture sensing is desired. As the soil moisture varies, the resistance measured between opposed conductive spikes, will vary proportionally. Although this resistance is not a linear relationship with respect to moisture content, there is a large linear region of resistance. Sensor 11 is adjusted to operate within that linear portion of resistance.

The output of sensor 11 is coupled to the input of scaling resistance 12. The range and sensitivity of soil moisture sensor 11 can be adjusted to within the linear range by resistance 12. Moreover, the larger the value of this resistance, the higher the resistance range of moisture sensor 11.

There is also provided a free running square wave oscillator 13, having its output coupled to an analog to digital converter 14. Converter 14 derives its set up and sampling timing from oscillator 13. A preferred operating range of 500 KHz ±20% was found to be desirable for oscillator 13.

Analog-to-digital converter 14 samples the analog voltage reading from moisture sensor 11, digitizes it, and outputs an equivalent 8 bit binary word to the address bus of microprocessor 36. Converter 14 preferably has a maximum input range of approximately five volts, and a maximum sampling frequency of approximately ten KHz.

There is also provided a gain scaling amplifier 15 to adjust the maximum threshold of analog-to-digital converter 14. The threshold output voltage of amplifier 15 is set to $\frac{1}{2}$ of the full scale voltage input of analog to digital converter 14. Amplifier 15 not only adjusts the maximum voltage measurement of converter 14, but establishes the setup size for a single bit. A low pass filter 16 coupled to the output of amplifier 15, and having its output connected to converter 14, removes high frequency noise and random signals from the input system coupled to sensor 11. The zero threshold circuit 17 also coupled to converter 14 adjusts the lowest reading from the analog to digital converter, or the zero output.

Triac pump controller 18 is used in conjunction with optical isolator 19 to gate the 24 VAC power to the master pump controller (not shown) of irrigation system 8. The master pump controller is only "ON" when there is a zone "ON". Optical isolator 19 provides electrical isolation between the gate of the triac controller 18 and the digital controlled output port or latch 20. This digital output port latches the control states for sensor 11 (logic "0"="ON"), optical isolator 19 (logic "0"="ON"), and conserve indicator LED 39 (logic "1"="ON").

The system also provides a plurality of triac solenoid controllers 22, each connected to a solenoid 7 to gate the power from the timer irrigation controller 8 to their respective zone solenoids 7. An optical isolator 23, comprised of a plurality of optically controlled triacs (one for each solenoid), provides electrical isolation between the gates of AC triacs controllers 22, and digital controlled latch 24. Output port or latch 24 has the following blocks latched at this digital port: operation indicator LED 21 (logic "0"="ON") and optical isolators 23 for each of the solenoid zones (logic "0"="ON").

The 24 VAC power lines from irrigation controller 8 enter control system 9 via a terminal strip 6 and are connected to the anode of their zone triac. These signals are fed to half wave rectifier 25, resistively scaled by divider 26, and electrically averaged or smoothed by capacitor 26 to provide the system information on which zones have been activated. The combination of these three circuits, comprising the peak detector, 26, 27 and 28, generate a signal that has a DC voltage level of approximately 2.5 volts when a 24 VAC signal is present on the anode of the appropriate triac. It also provides system 9 with the facility of filtering erroneous signals caused by electrical noise, spikes, or transients that would send the system incorrect information.

Once the input signals are electrically conditioned by peak detector circuits 25-27, they are compared by analog comparator 28 with a reference signal maintained by threshold circuit 30, to determine if the system will consider them to be valid or not. If the conditioned signal is greater than the reference (negative threshold), the analog comparators will output a digital logic "1" to buffer 29. If a valid conditioned signal is not present, the output of comparators 28 is approximately 0.2 V.

Tristate buffer 29 is digitally controlled and will allow the output signals of comparators 28 (or the indications of valid input signals for zones 1-7) in addition to the status of the bypass switch 31 to be placed on the system inputs. Bits 0-7 of the buffer 28 represent zones 1-7 and bit 7 indicates the status of bypass switch 31, with a logic "1" meaning an "ON" status.

Negative threshold circuits 30 serves as a voltage reference, which is applied to the negative inputs to analog comparators 28 for the conditioned input signals provided by peak detectors 25-27 to provide the system with reliable and consistent data (another form of data filtering). An input signal must be greater than one forward diode voltage drop of approximately 0.7 v set by this reference to trigger comparators 28 to signal the system that a valid signal for a zone exists.

Bypass switch 31, as indicated earlier, is used to override the system (allowing the timer controller to run without any intervention from the system). When the user places switch 31 in the bypass position, a 5 v signal is applied to buffer 29 thus causing a logic "1" on bit 7 of the digital word retrieved from that port. The system application program (stored in ROM 38) will recognize the user's request within one second, and place itself in the bypass state. When the system is placed in the bypass state, bypass indicators LED 32 will be turned "ON" to provide the user with a visual reassurance that system 9 is in the overridden state. When the system is in the water conservation phase, bypass LED 32 will be off.

At the center of the control system of the invention is microprocessor 36 which executes the application program of ROM 38, and provides all the system controls. MPU 36 has preferably 128 bytes of RAM (Random Access Memory) which is utilized by the microprocessor to store the irrigation characteristics as well as various dynamic variables. A 4.0 MHZ clock 34 provides the basic system timing for the execution of the system program, and is coupled to microprocessor 36.

There is also provided a learn pushbutton 33 that effectively "resets" the system. This momentary pushbutton controls the interrupt signal to microprocessor 36. Once microprocessor 36 detects the pressing of this button, the system will abort its current activity and perform a self check. It then clears the memory (RAM) or, in other words, erases all characteristic variables it had used previously including clock durations and moisture levels. The system will then begin to relearn the irrigation environment. The user is required to depress learn pushbutton 33 only when the soil is considered to be dry.

Upon a successful completion of this test, the system will turn on indicator LED 21 via output port 24, to assure the user of system integrity. Absence of this signal will alert the user that something is not working correctly, and that he should consult the user's manual.

When power is supplied to the unit, power circuit 35 consisting of an RC network provides a delay of the execution of the system program until all the electrical hardware is at full operating capacity, thus assuring a consistent and reliable system. Address and control lines of MPU 36 are channeled through a decoder 37 and through MSI circuits to provide microprocessor 36 with the facility to address and control the I/O ports of circuits 14, 20, 24 and 29 and the retrieval of instructions from the application ROM 38. The application program is permanently stored on the ROM 38 as well as the jump vectors for power up circuit 35 and learn button 33.

The learned indicator LED 39 is turned on by the system once it has obtained the complete set of irrigation environment characteristics. LED 39 provides the user with the reassurance that the system has shifted into the conservation phase of operation.

Battery back-up circuit 40 provides the system with the feature of retaining the irrigation characteristics in the event of a power failure by battery backing up the memory locations where these variables are stored. A Ni-Cd battery is trickle charged when the system is powered on via the 9 V DC power supply of power supply 24. This charging process requires approximately 14 hours and will be able to supply the memory with approximately 6 hours of back-up time. The 9 volt power from the battery is resistively divided and regulated to 5 volts by a zener diode.

A +5 volt power supply regulator 41 supplies all components on the circuit board with a regulated +5 VDC. The regulator inputs +9 volt DC (unregulated) from supply 42, scales and regulates it to a for +5 volt DC output. In addition, there is distributed capacitance on the supply line for noise and transient filtering. External power supply 42 uses the 120 VAC line voltage from a standard outlet, rectifies and filters it to produce a +9 volt DC output. The output is coupled to +5 volt supply 41. The power supply is preferably rated at 120 volt AC and one amp.

The learning phase is initialed by depressing learn button 33. This phase is responsible for the learning of the soil moisture characteristics and the duration settings on the existing irrigation system. Learn button 33 is depressed when the soil is considered to be dry, a condition where one would normally water if it were to be done manually.

When the learn button is depressed, the control system will perform a quick self test to assure the integrity of the system. Next, the control system will sense the soil's moisture level and store the "dry" reading in the system's memory 38. Microprocessor 30 samples the soil for moisture readings and gauges the amount of time each individual zone has to be watered. When the existing irrigation system decides to turn "on" or activate a particular zone or multiple zones, it will make calculations using the soil moisture level as a variable to determine what proportion of the normal watering duration is necessary to sufficiently water the soil. The system actually takes a series of "dry" readings and averages them before it stores a value in its memory 38. This procedure is performed every time a moisture reading is taken to assure that the system receives accurate results. After the calculations are completed, the inventive system will allow the driver signal from the irrigation system to power zone solenoids 7 via triacs, 22. The watering cycle will start with the activation of the zone containing sensor 11, and will end with the next new activation of the sensor zone. Within the watering cycle, each zone should be programmed to activate only once. The control system will then begin to monitor prior to the activation of the zones by the existing irrigation system. The system will then wait for the beginning of a watering cycle, which starts with the existing irrigation system activating the sensor zone. Until this occurs, the control system of the invention will simply turn on the same zones that the existing irrigation system has activated. Once the new watering cycle has begun, the control system of the invention will continue to monitor the irrigation system driver signals and turn on any zone which is activated, including the sensor zone. At the same time, however, the control system will record the duration in which the zone is "on". The control system can handle recorded readings for a duration of two minutes to fifteen hours, with a one second resolution. The control system will thus determing the normal or full duration of watering time set by the existing irrigation system. Using the calculated duration values, the system will interrupt the power to the zones once the proper amount of watering has occurred. This procedure will reduce the water consumption of the irrigation system by allowing the zones to be watered for only the exact amount of time necessary. Also, since the driver signals are supplied from irrigation system 8, inventive system 9 will not water longer than the time duration set on the irrigation system.

The system will continue to follow this pattern until the start of the next watering cycle (the sensor zone being again activated). When this occurs, the inventive control system has acquired all the normal time durations for the zones and its dry reading. Since all the zones are now watered to their proper level, the system will take another moisture reading, referred to as the "wet" reading. The storage of this "wet" reading will mark the end of the learning phase. The system will then examine the "dry" and "wet" readings to make sure that the range between them can be used in the system's calculations. If the "wet"-"dry" range can be used, the conservation phase is entered and learned LED 39 is turned on. If not, the learning phase is repeated to acquire more adequate moisture readings.

After the learn cycle has been completed, the inventive control system's algorithm will set the system into its conservation mode of operation. Therefore, the control system will never be in the learning phase for more than one watering cycle. Moreover, during this phase of operation, bypass switch 31 does not effect the system's ability to correctly perform its tasks. The inventive control system will remain in the conservation phase of operation until the system is powered down, or learn button 33 is again depressed. It is in this phase of operation that the control system will provide the water conservation, and bypass switch 31 is in the "off" position.

Each time the sensor zone is activated to start a watering cycle by the irrigation system, the inventive control system will take a moisture reading of the soil to determine the moisture content. This reading is called the "present" reading and is used in conjunction with the readings acquired during the learning phase (the wet and dry readings) to determine how long all the zones should be watered for this particular watering cycle. The inventive control system will take this "present" reading and see where it falls between the "dry" reading where the soil needs a full duration of watering, and the "wet" reading where the soil is moist and does not require any watering. For example, if the "present" reading is 30% of the "wet" reading for this particular watering cycle, the inventive control system will scale the recorded zone times to 70% of their normal durations and allow the zone to be watered, when activated, only as long as this newly calculated duration is based on the amount of water that is actually needed. The original normal duration is always stored by the system so that it may repeat this process at every start of a watering cycle. In the event that the "present" reading indicates that the soil is more moist than the wet reading, the system will not water any zones for that watering cycle. Conversely, if the system finds that the "present" reading is drier than the "dry" reading, it will allow the zones to be watered for their full normal duration.

If at any time during this conservation phase of operation, bypass switch 31 is turned on, the inventive control system will allow irrigation system 8 to water the zones for any duration for which it is set. When, however, bypass switch 31 is turned off, the inventive control system will return to its conservation mode of operation.

The inventive control system also has a battery backup circuit 40 that will retain the soil's moisture characteristics and normal duration settings in the event of a power failure. Thus, when power is restored, the system may circumvent the learning phase and go directly to the conservation phase. This feature allows the system to recover from a power failure without any manual requirements from the user.

1. Referring to FIGS. 3A, B and C, and 4–15, when the control system is powered up or has been reset, the stack pointer 51 is initialized to the highest random access memory address.

2. Power to all zone solenoids 7 is turned off. The control of power to the existing irrigation system's solenoids is performed by outputting an 8 bit data word to the port "output". The lowest seven bits are for the seven zones. A logic 0(1) to the port enables (disables) the power to the respective zone solenoids. The most significant bit is used to keep the Normal LED 21 on at all times, except when there is a malfunction. A logic 0k (1) keeps the light on (off).

3. Power to the pump master control 18 and sensor 11 is turned off and the Conserve LED 39 is turned off.

This is performed by outputting an 8 bit data word to port "Output 2" 20. The least significant bit (bit 0) is the Conserve LED. A logic 0(1) turns the LED on (off). The next least significant bit (bit 1) controls the pump master 18. A logic 0(1) enables (disables) the power to pump master 18. If any zone is being provided with power, then the pump master must also be enabled. The next significant bit (bit 2) of the port "Output 2" 20 is used to control sensor 11. A logic 1(0) enables (disables) sensor 11. The sensor is enabled twenty seconds prior to a moisture reading, then disabled at the completion of the reading.

4. The processor's interrupt is enabled to allow the detection of a power failure to the system.

5. The system determines whether this "power-up" is following the recovery of a power failure to the system and if the system has stored the desired moisture characteristics of the soil and the individual zone's cycle durations. The moisture characteristics are two 8 bit data words, dry reading and wet reading, that are stored in memory. The magnitude of the wet reading is always greater than the dry reading. The individual zone's cycle durations are each 16 bit data words. A value of 350 represents that the cycle's maximum duration is 350 seconds. The seven durations are stored in consecutive memory locations, with the lower numbered zones being at the lower addresses.

6. If the system already has the desired characteristics, the program jumps to the conservation portion of the program (step 85).

7. If the system does not have the characteristics, the program then performs a test on the memory of the system to verify its operation. A checkerboard memory test is performed on the 128 bytes of RAM 36 (Random Access Memory). This test involves writing the hexadecimal AA (10101010) and 55 (01010101) into alternate memory locations. The memory locations are then read back to verify the correct operation of the RAM. The pattern is then reversed, with the writing of 55 and AA into alternate locations, which is then read back.

8. If the test fails, then the system goes into the bypass mode where it simply mimics the operation of the existing automatic irrigation system. The normal LED 21 will be turned off, alerting the user of a malfunction.

LEARNING PHASE

9. If the test passes, then all RAM locations are initialized to 00.

10. The system now enters the Learning phase of the program.

11. Memory locations that contain the system's "status" of the seven zone's solenoid lines, the pump control, and Conserve LED denoted by Pcwreg, Pump, and Learncmplt, respectively, are set to their disabled or off state.

12. The status of the sensor control is set to its enabled or "on" state.

13. The system controls the existing automatic irrigation system operation by outputting two 8 bit words to ports "Output" and "Output 2" as described in steps 2 and 3. The system also utilizes a one second delay loop at this time, which allows the system to learn that a zone was turned "on" and for how long.

14. The initial on state of the sensor 11 is maintained for 20 seconds.

15. After 20 seconds, a moisture reading is taken by reading the input data at port "Getad". The reading is performed once every four consecutive seconds. The value of the moisture reading that is used is the average value of the four readings.

16. The reading is stored in a memory location, denoted by dry reading 53.

17. The sensor state is set to "disabled" or "off" 54.

18. The system outputs data to ports "Output" 24 and "Output 2" 20.

19. Input data from port "input zone" 55 is read. The data word is 8 bits, with the lower seven bits representing which state the existing automatic irrigation system wants the solenoids 7 to be in. A logic 1(0) is to turn on (off) the solenoid 7. The most significant bit is for the Bypass switch 31.

19A. The most significant bit (Bypass) is masked out.

20. The input word is compared to the word read one second before. This system only considers a word valid if it's the same for two consecutive seconds. This is to insure a stable input from the automatic irrigation system 8.

21. If the words are not the same, then return to step 18.

22. If the words are the same, which means the input is valid, the value is stored in the Process Control Word (Pcwreg), which is the status register of the seven solenoids 7.

23. The system checks for the instance when the existing automatic irrigation wants to turn on the solenoid 7 of the zone where the moisture sensor 11 is located. This is done by checking if the least significant bit of the Pcwreg has changed value from a logic 0 (off) to logic 1 (on). This zone is referred to as either the sensor zone or zone 0. A change of value from 0 to 1, signifies the beginning of a cycle for the zone.

24. If the sensor zone bit is off (0) or already on (1), then the system mimics the operation of the solenoids 7 according to the automatic irrigation system by returning to step 18.

25. Data is output to ports "Output" and "Output 2" to turn on the solenoids 7 and there is a one second delay.

26. The system then increments the duration by 1 (for one second) for those zones that are "on" and are within their first cycle.

27. Input data from port "input zone" is read. See step 19.

27A. The most significant bit is masked out.

28. The input word is compared to the word read one second before.

29. If the words are not the same, then return to step 25.

30. If the input word is valid then compare it to the previous valid input word.

31. If the words are the same then return to step 25.

32. If the words are not the same then update the Pcwreg and Watered registers due to the change in the input word. A 1 (0) in a bit of Watered signifies that the respective zone has completed one cycle. The least significant bit is the sensor zone.

33. The system checks if the sensor zone is still on (1).

34. If the sensor zone is still on, then return to step 25.

35. If the sensor zone is off, then start the twenty minute timer.

36. Data is output to ports "Output" 24 and "Output 2" and there is a one second delay.

37. The system then increments the duration by 1 for the zones that are turned on and within their first cycle.

38. Decrement the twenty minute timer.

39. If there is 20 seconds left on the timer then turn on the sensor.

40. Check to see if the 20 minute timer has timed out.

41. If the 20 minutes has not elapsed then go to step 56.

42. If the 20 minutes has elapsed then a moisture reading is taken by reading the input port "Getad" (See step 15).

43. The reading is stored in memory denoted as wet reading.

44. Check to see if the value in wet reading is greater than the value in dry reading plus six.

45. If it is that much greater then go to step 56.

46. If it is not that much greater then the system will wait for the beginning of a new sensor zone cycle (watering cycle).

47. The system outputs data to the ports "Output" and "Output 2" and there is a one second delay.

48. Input data from port "Input zone" is read.

49. The most significant bit is masked out.

50. The input word is compared to the word read one second before.

51. If the words are not the same then return to step 47.

52. If the words are the same, which means the input is valid, then update the value of the Process Control Word (Pcwreg).

53. The system checks for the instance when the sensor zone begins a new cycle (See step 23).

54. If it is not a new cycle then return to step 47.

55. If it has started a new cycle then return to step 1.

56. Input data from port "Input port" is read.

57. The most significant bit is masked out.

58. The input word is compared to the word read one second before.

59. If the words are the same then go to step 65.

60. If the words are not the same then check to see if there is a valid wet reading.

61. If there is a valid reading then return to step 36.

62. If there is not a valid reading then output data to ports "Output" and "Output 2" and there is a one second delay.

63. The system then increments the duration by 1 for zones that are turned on and on their first cycle.

64. Return to step 56.

65. The Pcwreg and Watered registers due to the new change in the input word (see step 23).

66. The system checks to see if the sensor zone (zone is still off.

67. If the sensor zone is still off then return to step 60.

68. If the sensor zone is on then check to see if there is a valid wet reading.

69. If there is a valid reading then go to step 85.

70. If there is not a valid reading then update the Pcwreg register to keep the sensor zone off.

71. Data is output to ports "Output" and "Output 2" and there is a one second delay.

72. Decrement to twenty minute timer.

73. If there is twenty seconds left on the timer then turn the sensor on.

74. Check to see if the twenty minute timer has timed out.

75. If the twenty minutes has not timed out then go to step 79.

76. If it has timed out then check to see if the value of wet reading is greater than the value in dry reading plus six.

77. If it is not greater then return to step 1.

78. If it is greater and therefore valid then go to step 85.

79. Data from port "Input Zone" is read.

80. The most significant bit (bit 7) and the least significant bit (bit 0) that are the Bypass and sensor zone, respectively, are masked out.

81. The input is now compared to the word read one second before.

82. If the words are not the same then return to step 71.

83. If the words are the same then update the Pcwreg register to keep the sensor zone off.

84. Return to step 71.

CONSERVATION PHASE

85. The memory location that contains the system status of the Conserve LED is set to the enabled or on state and the status of the pump master and sensor to the disabled or off position. Other memory locations are also initialized.

86. Data from port "Input Zone" is read.

87. The input word is compared to the word read one second before.

88. If the words are not the same then return to step 86.

89. If the word is valid then check to see if the Bypass switch (Bit 7) is on.

90. If the Bypass is set then go to step 110.

91. If it is not set then compare this valid input with the previous valid input.

92. If the words are the same then go to step 104.

93. If the words are not the same then check to see if the sensor zone (zone 0) has turned on.

94. If it has not turned on then go to step 103.

95. If it has turned on then the status register and Pcwreg is updated to the value of the input data and the Watered register is cleared.

96. The status of the sensor is set to on.

97. This state is maintained for twenty seconds.

98. After twenty seconds, a moisture reading is taken by reading the input data at port "Getad" (see step 15).

99. The reading is stored in memory location "present reading".

100. The sensor's state is set to off.

101. The cycle duration, which are two bytes long, that are stored in consecutive locations starting at Counter, for each zone is calculated. This duration is how long a zone will stay on during this new cycle. The calculation is as follows:

$$\text{cycle duration} = (\text{wet reading} - \text{present reading})/(\text{wet reading} - \text{dry reading}) * \text{duration}$$

This is done for all seven zones. The cycle duration is always a fraction of the original duration.

102. Return to step 86.

103. Update register and Pcwreg to reflect the change of input data.

104. Data is output to ports "Output" and "Output 2" and there is a one second delay.

105. Check to see if the Pcwreg is zero (all zones off).

106. If it is zero then return to step 86.

107. If it is not (at least one zone is on) then decrement the cycle durations of those zones that are on.

108. If any zone's cycle duration has timed out then update the Pcwreg and Watered registers to reflect this change. A zone that times out is then disabled.

109. Return to step 86.

BYPASS MODE

110. The Pcwreg is updated to the value just read at the input. In the Bypass mode, the system enables whatever zones the existing automatic irrigation system wants to turn on.

111. Data is output to ports "Output" and "Output 2" and there is a one second delay.

112. Data is read from the port "Input Zone".

113. The input word is compared to the input read one second before.

114. If the words are not the same then return to step 111.

115. If the words are the same then check to see if the Bypass switch is still on.

116. If it is on then return to step 110.

117. If the Bypass switch is off then check to see if the zone 0 flag is off.

117a. If it is not then go to step 117c.

117b. If it is then clear the zone 0 word.

117c. Check to see if this new valid response is the same as the previous valid response.

118. If it is not new then return to step 110.

119. If the words are different then check to see if the sensor zone is on.

120. If it is not then return to step 110.

121. If the sensor zone is on then check to see if it just turned on.

122. If it did not just turn on then return to step 110.

123. If it did just turn on then return to step 85.

THIS IS THE END OF BYPASS MODE.

In an actual embodiment of the system, the unit used a single printed circuit card microprocessor based system, having the power supply section (DC power supply, regulator, and battery backup circuits), the central processing unit (microprocessor, read only memory (ROM), and address decoding logic), and the I/O section, (two input ports-one 8 bit digital, and one 8 bit analog to digital, and an output port 8 bit digital).

The central processing unit consists of the following: Motorola 6802 8 bit microprocessor with 128 bytes of internal random access memory (RAM), Texas Instruments TMS2523 4096 byte read only memory (ROM), dual 2 to 4 decoder 74LS139, and quad 2 input nand gate 74LS00. The processor operates at a clock frequency of 1.0 Megahertz. The clock is generated by an external 4.0 Megahertz crystal (±0.0005% tolerance), which the microprocessor internally divides by 4. With the application ROM installed in the board, the processor will poll Input Port I, once each second, for a trigger signal. Upon a valid trigger signal (8 bit digital bit pattern) occurring on Input Port I, the processor will input data from Input Port II. The processor will then make a series of calculations, and send the appropriate output response to Output Port 24.

While only two embodiments of the present invention have been shown and described, it will be obvious that many changes and modifications maybe made thereunto, without departing from the spirit and scope of the invention.

What is claimed is:

1. A water conservation apparatus for controlling duration of irrigation watering cycles of a timed irrigation system having control valves that deliver water to preselected ground zones comprising:

moisture sensing means disposed in contact with at least one ground zone for detecting moisture content of the at least one ground zone;

central processing means coupled to said sensing means for processing data on the moisture content of the at least one ground zone;

solid state memory means coupled to said central processing means and having a stored applications program for sampling the ground moisture content detected by said sensor means;

means for initializing said solid state memory means to take a plurality of samples of dry and wet moisture readings, and averaging and storing resultant dry and wet readings in said memory means;

control means coupled to said central processing means, said control means sensing by means of said moisture sensing means moisture content in the at least one ground zone and scaling back the amount of water distributed by the irrigation system in proportion to the moisture content in at least one ground zone, as determined by the stored wet and dry readings in said memory means, said control means thereby shortening or shutting off the water cycles of the irrigation system as the ground moisture content increases.

2. The water conservation apparatus as recited in claim 1 wherein said means for initializing comprises a learn button for resetting and recycling said stored applications program to reestablish dry and wet moisture readings for the at least one ground zone.

3. The water conservation apparatus as recited in claim 2, additionally comprising an indicator light coupled to said central processing means for indicating a resetting of wet and dry moisture limits of the at least one ground zone area.

4. The water conservation apparatus as recited in claim 3, wherein the stored applications program of said solid state memory means includes a 20 minute delay following the irrigation watering cycle for measuring the wet moisture limit.

5. The water conservation apparatus as recited in claim 1, wherein said control means comprises triac solenoid controllers coupled between the irrigation system and the at least one ground zone for controlling the water delivered to the at least one ground zone.

6. The water conservation apparatus as recited in claim 1, additionally comprising bypass switch means coupled to said central processing means for bypassing the stored applications program and permitting the timed irrigation system to water the at least one ground zone.

7. The water conservation apparatus as recited in claim 6, wherein said bypass switch means includes a bypass indicator light for indicating that the bypass has been turned on.

8. The water conservation apparatus as recited in claim 1, wherein said solid state memory means comprises a ROM.

9. The water conservation apparatus as recited in claim 1, additionally comprising a battery backup circuit coupled to said central processing means and said solid state memory means for providing power during a power interruption.

10. The water conservation apparatus as recited in claim 1, wherein said moisture sensing means comprises a pair of spaced apart electrodes disposed in the at least one ground zone, a scaling resistance circuit coupled to said spaced apart electrodes for adjusting resistance of the at least one ground zone between said electrodes, and an analog-to-digital converter for converting the ground resistance readings into digital data.

11. A method for conserving irrigation water by controlling duration of irrigation water cycles of a timed irrigation system having control valves that deliver water to preselected ground zones comprising the steps of:

sensing with a sensor at least one ground zone for providing wet and dry data of moisture content of the at least one ground zone;

processing the data received from said sensor using a processor to determine the moisture content of the at least one ground zone;

initializing a solid state memory means by taking a plurality of samples of dry and wet moisture limit readings and averaging and storing the resultant dry and wet moisture limit readings in said solid state memory means;

comparing the dry and wet moisture limit readings in the solid state memory coupled to the processor and using a stored applications program for sampling ground moisture data produced by the sensor; and operating said sensor to measure the moisture content in the at least one ground zone and scaling back the amount of water distributed by the irrigation system in each irrigation cycle in proportion to the moisture content in the at least one ground zone, by shutting off the control valves of the irrigation system for each of the watering cycles.

12. The method as recited in claim 11, wherein said step of initializing comprises depressing a learn button to reset the stored applications program of the solid state memory in order to reestablish the dry and wet moisture limit readings of the at least one ground zone.

13. The method as recited in claim 12, additionally comprising turning on a learn indicator lamp when the applications program of the solid state memory has completed its initialization of establishing the dry and wet moisture limit readings.

14. The method as recited in claim 13, wherein said step of initializing comprises delaying reading of the wet limit reading a sufficient time to allow moisture to sink into the at least one ground zone before the wet limit reading is taken.

15. The method as recited in claim 14, wherein said step of initializing comprises taking a plurality of readings with said sensor, combining the readings taken by said sensor to provide an average reading of dry or wet moisture levels and feeding the average reading to said processor and memory to determine the dry or wet moisture levels of the at least one ground zone.

* * * * *